(No Model.) 2 Sheets—Sheet 1.
J. F. F. GATGENS & R. C. DOWDIN.
WEED PULLER.
No. 466,674. Patented Jan. 5, 1892.
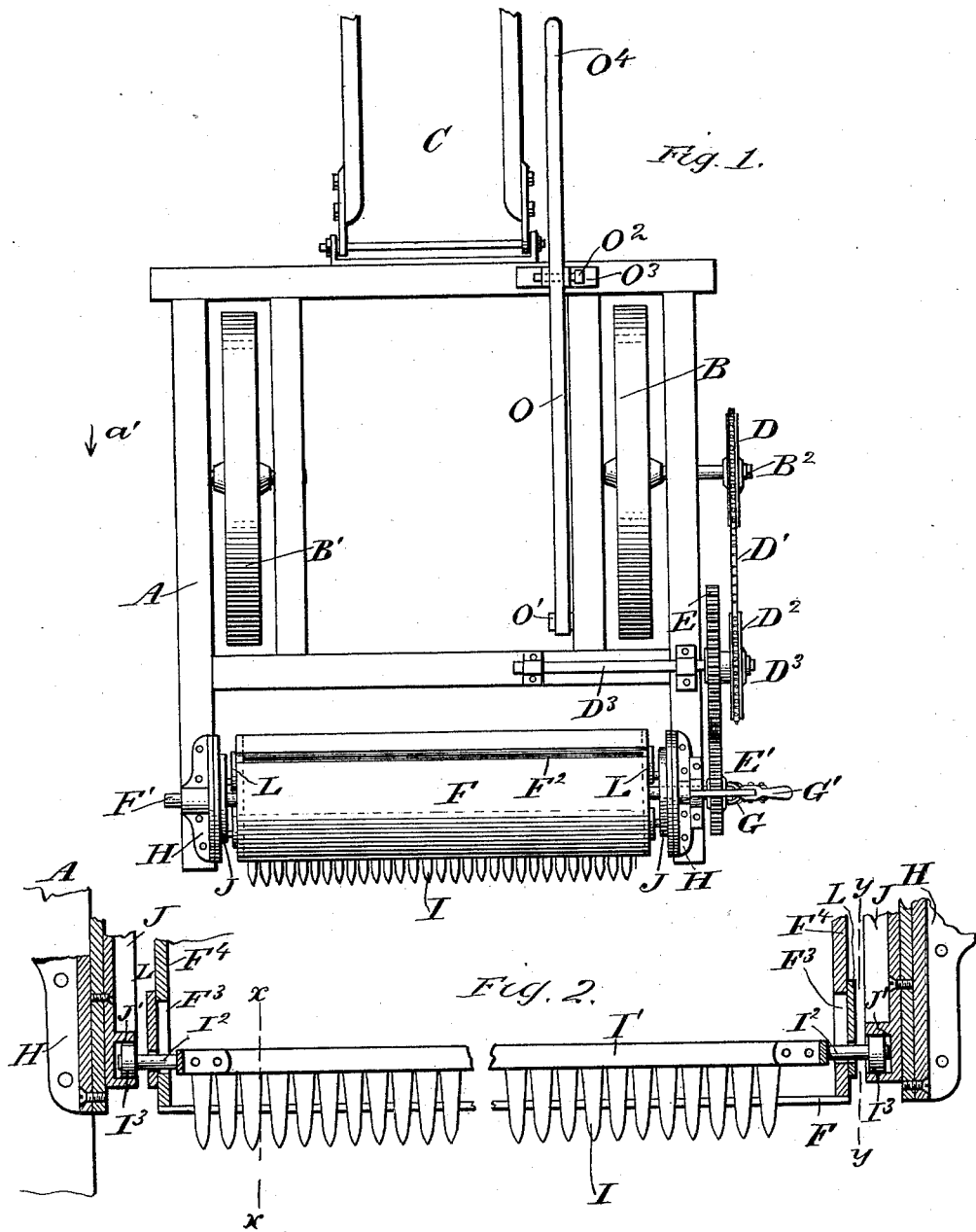
WITNESSES:
N. R. Davis.
C. Sedgwick
INVENTORS:
J. F. F. Gatgens
BY R. C. Dowdin
Munn
ATTORNEYS
THE NORRIS PETERS CO., PHOTO-LITHO., WASHINGTON, D. C.

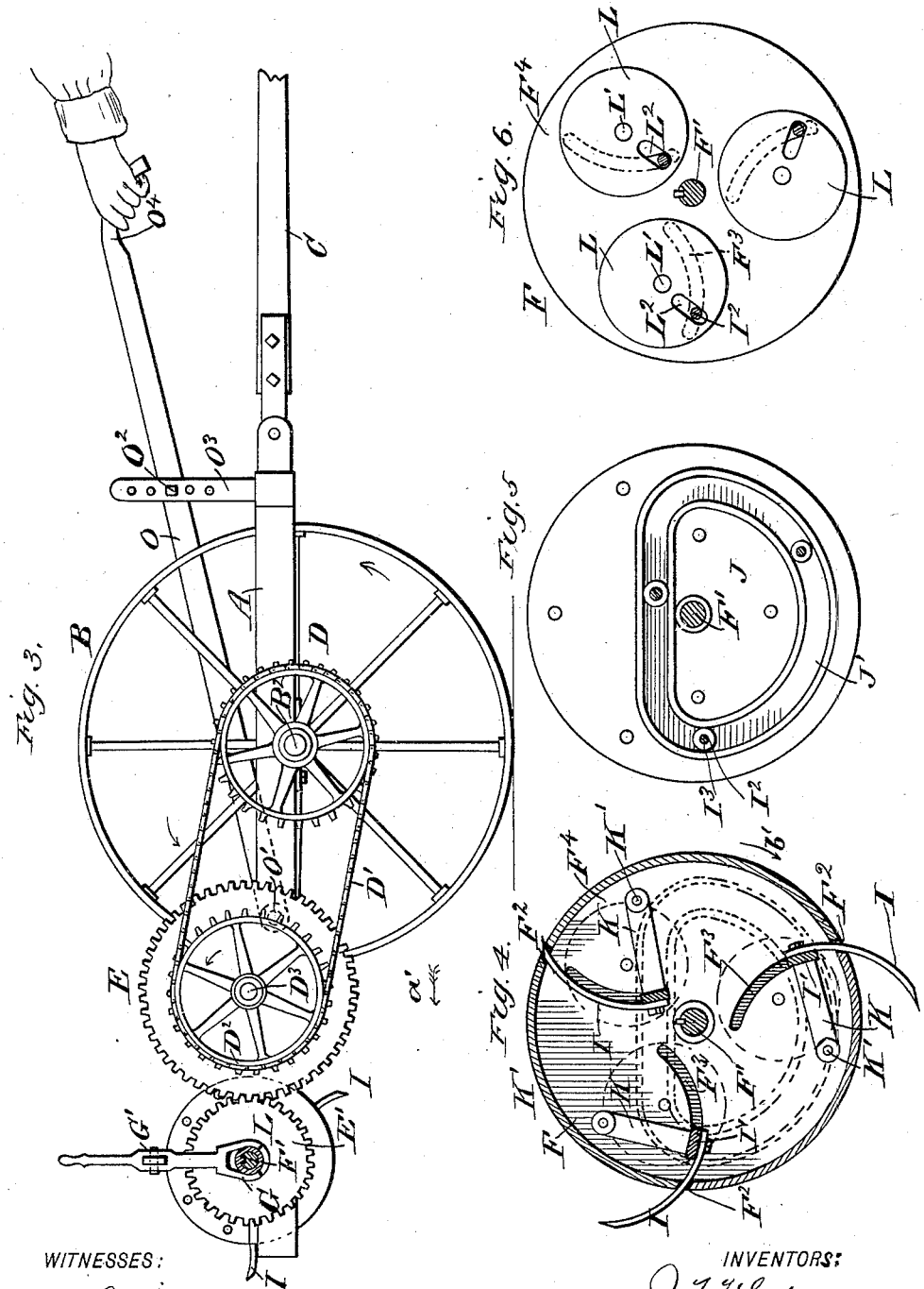

UNITED STATES PATENT OFFICE.

JOHN F. F. GATGENS AND ROBERT C. DOWDIN, OF CENTRAL HOUSE, CALIFORNIA.

WEED-PULLER.

SPECIFICATION forming part of Letters Patent No. 466,674, dated January 5, 1892.

Application filed April 11, 1891. Serial No. 388,502. (No model.)

*To all whom it may concern:*

Be it known that we, JOHN F. F. GATGENS and ROBERT C. DOWDIN, both of Central House, in the county of Butte and State of California, have invented a new and Improved Weed-Puller, of which the following is a full, clear, and exact description.

The object of the invention is to provide a new and improved weed-puller which is simple and durable in construction, very effective in operation, easily manipulated, and designed to pull the weeds entirely out of the ground or to only strip the unripe seeds and leaves off the weeds, thereby killing the latter and preventing further germination.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a plan view of the improvement. Fig. 2 is an enlarged sectional plan view of the drum, comb, and adjacent parts. Fig. 3 is a side elevation of the improvement, with parts in section. Fig. 4 is an enlarged transverse section of the drum on the line $x\ x$ of Fig. 2. Fig. 5 is a face view of the cam for the combs, and Fig. 6 is a transverse section of the drum on the line $y\ y$ of Fig. 2.

The improved weed-puller is provided with a suitably-constructed frame A, mounted on wheels B and B' and provided at its rear end with shafts C, to which the animal is hitched for pushing the machine over the ground in the direction of the arrow $a'$.

On the shaft $B^2$ of the drive-wheel B is secured a sprocket-wheel D, over which passes the sprocket-chain D', also passing over a sprocket-wheel $D^2$, secured on a shaft $D^3$, mounted to turn in suitable bearings on the main frame A. On this shaft $D^3$ is secured a gear-wheel E, in mesh with a smaller gear-wheel E', mounted to turn loosely on the shaft F', carrying the drum F, and mounted to turn in bearings H, secured on the front end of the side beams of the main frame A. The outer face of the gear-wheel E' is formed with clutch-teeth, adapted to be engaged by a clutch G, mounted to turn with and to slide on the drum-shaft F', so as to connect or disconnect the gear-wheel E' with the said shaft F'. For conveniently moving the clutch G in and out of contact with the clutch-teeth on the gear-wheel E' a shifting-lever G is provided, fulcrumed on the frame A.

The drum F is formed in its rim with a series of longitudinally-extending slots $F^2$, in each of which is adapted to move a comb provided with teeth I, as is plainly illustrated in Fig. 2, the said teeth I being secured to a transversely-extending bar I', having its ends formed with trunnions $I^2$, passing through segmental slots $F^3$ in the heads $F^4$ of the drum F. The teeth I are preferably tapering from their base to the point, as illustrated in Fig. 2, so that two adjacent teeth form a V-shaped opening, into which the stems of the weeds to be pulled can readily pass to permit the teeth to firmly grip and hold the stems while pulling the weeds. The teeth are also curved, as shown in Fig. 4, for readily passing through the longitudinal slots $F^2$. The outer ends of the trunnions $I^2$ carry friction-rollers $I^3$, mounted to travel in cam-grooves J' of cams J, bolted or otherwise fastened to the inner faces of the bearings H. The lower part of each cam-groove J' is semicircular, as is plainly illustrated in Fig. 5, the center being in the center of the shaft F'. The upper part of the cam-groove is straight and extends directly over the shaft F', as shown in said Fig. 5. Thus when the drum F is revolved and the friction-rollers $I^3$ of the bar I' travel in the lower or semicircular part of the cam-groove J', then the teeth I of the comb project through the longitudinal slots $F^2$, as is plainly illustrated at the left and at the bottom of Fig. 4. When, however, the friction-rollers $I^3$ pass into the horizontal part of the cam-groove J', the teeth I recede and pass almost completely within the drum and remain in this position as long as the friction-rollers travel in the horizontal part of said cam-groove.

In order to guide the bars I', carrying the teeth I of the comb, arms K are provided, pivoted at K' to the inside of the heads $F^4$, the other ends of the said arms being bolted or riveted to the bars I'. The center of the pivot K' for the arm K also forms the center for the segmental slots F³ of the respective trunnions I².

In order to prevent dust, dirt, &c., from passing through the slots F³ into the drum F, disks L are provided, one for each slot, the said disks being pivoted at L' to the outside of the heads F⁴, so as to turn on their pivots, each disk being also provided with a radial slot L², through which passes the respective trunnion I². (See Fig. 6.)

In order to raise or lower the front end of the machine, a lever O is provided, fulcrumed at O' to one of the longitudinal beams of the main frame, as is plainly shown in Fig. 1, the said lever being adapted to be fastened by a bolt O² in a bracket O³, erected on the rear transverse beam of the said main frame. The rearward end of the handle O' is formed with a handle O⁴, adapted to be taken hold of by the operator, so as to guide the front end of the frame A in its up or down movement, according to the condition of the ground over which the machine is pushed.

The operation is as follows: When the machine is pushed over the ground in the direction of the arrow a', then the driving-wheel B imparts a rotary motion to the drum F when the clutch G is engaged with the gear-wheel E'. The operator by manipulating the lever O can raise and lower the front end of the main frame A, so as to bring the drum F nearer to or farther from the ground, as desired, according to the nature of the wheels to be pulled. The drum F revolves in the direction of the arrow b', so that each comb moves into its outermost position previous to reaching its lowermost position, so that the teeth of the comb come in contact from the rear with the weeds, engaging the same between the teeth thereby, and at a further revolving of the drum pull the weeds upward out of the ground, or in case the weeds are well rooted the leaves or seeds are stripped off of them by the teeth of the comb. As soon as the comb with the weeds or leaves attached has reached about a horizontal position, as shown in Fig. 4, the said comb commences to recede, owing to the action of the cam J, in which travel the rollers I³. The teeth of the comb thus pass inward through the slots F², whereby the weeds, seeds, or leaves are pushed off the teeth by coming in contact with the periphery of the drum F. As soon as the teeth of the comb have receded within the drum, as shown at the top of Fig. 4, the weeds are entirely disengaged from the respective comb and naturally drop to the ground. At the further forward movement of the machine the comb finally moves outward again to engage the following weeds in the manner above described. It will be seen that by this construction weeds can be pulled out of the ground which has been cultivated and in which the grain has appeared, the weeds extending above the grain, so that when the combs pass into the weeds the fine leaves of the grain readily escape between the teeth of the comb, and the grain is consequently not disturbed, but the weeds are pulled up.

Having thus fully described our invention, we claim as new and desire to secure by Letters Patent—

1. A weed-puller adapted to be pushed from the rear and comprising a vertically-rocking wheeled frame open at its front end, a rotary longitudinally-slotted cylinder F, journaled in the open front end of the frame and having a series of sliding combs projecting through the slots, and cams secured to the sides of the frame at the cylinder ends and engaging trunnions on the combs to throw and retract the combs, substantially as set forth.

2. A weed-puller comprising the frame open at its front end, wheels supporting the frame between its ends, a handle projecting from the rear of the frame to raise or depress its open front end, a rotary longitudinally-slotted cylinder journaled in said open end and provided with sliding combs having end trunnions, cams on the side bars of the frame for throwing and retracting the cams, and gearing connecting the cylinder and one of the drive-wheels, substantially as set forth.

3. In a weed-puller, the cylinder having longitudinal slots and a series of curved slots in its ends, arms pivoted to the inner faces of the cylinder ends and carrying combs sliding in the longitudinal slots and having end trunnions extending through the end slots, and disks L, pivoted to said ends, closing the slots therein, and having apertures L², through which the comb-trunnions project, substantially as set forth.

4. In a weed-puller, the combination, with a revoluble drum provided with longitudinal slots in its rim, of a comb provided with teeth, a bar carrying the said teeth, the said teeth being adapted to pass through the said slots in the drum, trunnions formed on the said bar and carrying friction-rollers, fixed cams engaged by the said friction-rollers to cause the said combs to slide inward and outward in the said drum when the latter revolves, arms pivoted in the said drum and connected with the bar of the said comb, so as to guide the outward and inward movements of the comb, and disks pivoted on the heads of the drums and adapted to close the slots in the heads of the drum and through which pass the said trunnions, substantially as shown and described.

JOHN F. F. GATGENS.
ROBERT C. DOWDIN.

Witnesses:
W. J. WATERS,
A. SWEETSER.